(12) United States Patent
Nishimura et al.

(10) Patent No.: US 11,760,269 B2
(45) Date of Patent: Sep. 19, 2023

(54) TRUNK STRUCTURE FOR VEHICLE

(71) Applicant: MAZDA MOTOR CORPORATION, Hiroshima (JP)

(72) Inventors: Keishi Nishimura, Hiroshima (JP); Akira Sasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 13 days.

(21) Appl. No.: 17/725,248

(22) Filed: Apr. 20, 2022

(65) Prior Publication Data
US 2022/0363199 A1  Nov. 17, 2022

(30) Foreign Application Priority Data

May 13, 2021  (JP) ................................. 2021-081666

(51) Int. Cl.
  *B62D 43/06*  (2006.01)
  *B60R 5/04*  (2006.01)
(52) U.S. Cl.
  CPC .............. *B60R 5/047* (2013.01); *B62D 43/06* (2013.01)
(58) Field of Classification Search
  CPC ........ B60R 5/047; B62D 43/06; B62D 43/10; B60J 7/085
  USPC ....................................................... 296/37.3
  See application file for complete search history.

(56) References Cited

U.S. PATENT DOCUMENTS

| | | | | |
|---|---|---|---|---|
| 4,168,094 A | * | 9/1979 | Yagi ........................ | B60R 5/047 296/37.16 |
| 2008/0179022 A1 | * | 7/2008 | Hayashi .................. | B60R 5/047 160/327 |
| 2011/0266828 A1 | * | 11/2011 | Kikuchi ..................... | B60R 5/04 296/136.04 |
| 2015/0343954 A1 | * | 12/2015 | Shin ........................ | B60R 5/047 160/264 |
| 2016/0347255 A1 | * | 12/2016 | Fujii ....................... | B60R 5/047 |
| 2018/0079457 A1 | * | 3/2018 | Jaradi .................. | B62D 43/002 |
| 2021/0300230 A1 | * | 9/2021 | Myszkowski ........... | B60R 5/047 |
| 2022/0348144 A1 | * | 11/2022 | Nishimura .............. | B60R 7/005 |

FOREIGN PATENT DOCUMENTS

DE    102016212038 A1 *  1/2018
WO     2010/079576 A1    7/2010

* cited by examiner

*Primary Examiner* — Amy R Weisberg
*Assistant Examiner* — Sara Laghlam
(74) *Attorney, Agent, or Firm* — Studebaker & Brackett PC (57) ABSTRACT

A trunk structure for a vehicle is provided which can house both a spare tire and a tonneau cover below a floor board in a trunk, and has high operability in housing, removing, and replacing the spare tire and the tonneau cover. A trunk of a vehicle has a spare tire housing and a tonneau cover housing below a floor board. A tonneau cover has a tube portion, a sheet portion, and an extension plate portion. The tonneau cover housing has a portion located between the spare tire and a rear end of the trunk, in which the tube portion of the tonneau cover is stored in a rolled state. The housing also has a portion above a part of the spare tire where the extension plate portion, extending outward from the tube portion when the sheet portion is rolled in the tube portion, is horizontally disposed.

20 Claims, 10 Drawing Sheets

TRUNK STRUCTURE FOR VEHICLE

TECHNICAL FIELD

The present disclosure relates to a trunk structure for a vehicle, particularly to a trunk structure which includes a configuration capable of housing a spare tire below a floor board.

BACKGROUND ART

In a wagon type vehicle, an SUV (sport utility vehicle), and so forth, a trunk is provided to an area in the rear of rear seats. Furthermore, in such vehicles, a tonneau cover covering an upper side of goods loaded in the trunk is sometimes used to provide privacy protection, security for crime prevention, and so forth. For example, a tonneau cover can be employed which has a sheet portion capable of being rolled in and drawn out from a tubular portion and a plate-shaped extension plate portion mounted on a distal end of the sheet portion. The extension plate portion is not rolled in the tubular portion but extends outward from the tubular portion.

International Publication No. WO 2010/079576 discloses a configuration in which a tonneau cover in a rolled state can be housed in a groove portion provided below a floor board when the tonneau cover is not used. A housing structure of a tonneau cover which is disclosed in International Publication No. WO 2010/079576 has a shape where groove-shaped recesses and a bottom side recess are continuous with each other, the groove-shaped recesses being configured to enable both ends of a tubular portion of the tonneau cover to be caught therein, the bottom side recess being formed downward from the groove-shaped recesses such that an extension plate portion of the tonneau cover can be housed such that the extension plate portion sags downward from the tubular portion.

SUMMARY

Depending on places of delivery, installation of a spare tire in a vehicle is required. The spare tire is housed in a spare tire housing portion provided below a floor board. In such a vehicle, it is necessary to secure a space for housing the spare tire and a space for housing a tonneau cover below the floor board. In this case, it is necessary to provide housing parts of the spare tire and the tonneau cover taking into consideration removal and housing of the spare tire and the tonneau cover through a rear area of the trunk. That is, it is demanded that the spare tire and the tonneau cover be housed in a range reachable for a hand of a user from the rear area of the trunk.

Note that it is possible that a housing recess of the tonneau cover which is disclosed in above International Publication No. WO 2010/079576 is provided between the housing part of the spare tire in the trunk and a rear end of the trunk.

However, because in the housing part of the tonneau cover which is disclosed in above-discussed International Publication No. WO 2010/079576, an extension plate portion of the tonneau cover is housed in a posture where the extension plate portion is directed in an up-down direction, a problem occurs in that the height from the ground to the floor board becomes higher by the amount of the width of the extension plate portion, loading capacity of goods decreases, and usability degrades.

The present disclosure has been made to solve the above problems by providing a trunk structure for a vehicle which can house both a spare tire and a tonneau cover below a floor board in a trunk and which has high operability in housing and taking out the spare tire and the tonneau cover.

A trunk structure for a vehicle according to one aspect of the present disclosure is capable of housing a spare tire and a roll-up type tonneau cover below a floor board of a trunk. The trunk structure for a vehicle according to this aspect includes a spare tire housing portion and a tonneau cover housing portion. The spare tire housing portion is a section which is formed below the floor board and is for housing the spare tire. The tonneau cover housing portion is a section which is formed below the floor board and is for housing the tonneau cover in a rolled state.

The tonneau cover has a tube portion which has a tubular shape, a sheet portion, and an extension plate portion. The sheet portion is a section which is capable of being rolled in and drawn out from an inside of the tube portion. The extension plate portion is a plate-shaped section which is connected with an end edge of the sheet portion and is situated on an outside of the tube portion in a state where the sheet portion is rolled in the tube portion.

The tonneau cover housing portion has a portion which is located between the spare tire housing portion and a rear end of the trunk in a front-rear direction of the vehicle and in which the tube portion is arranged and a portion which is located above a part of the spare tire housed in the spare tire housing portion and in which the extension plate portion is arranged in a direction intersecting with an up-down direction of the vehicle so as to cover the part of the spare tire.

In the trunk structure for a vehicle according to the above aspect, in a state where the spare tire and the tonneau cover are housed below the floor board, the extension plate portion of the tonneau cover is situated to cover an upper area of the part of the spare tire. Thus, in the trunk structure for a vehicle according to the above aspect, while both of the spare tire and the tonneau cover are housed in the trunk, the size of a housing portion in the front-rear direction can be reduced to a small size. That is, in the trunk structure for a vehicle according to the above aspect, compared to a case where the spare tire housing portion and the tonneau cover housing portion are aligned in the front-rear direction in a positional relationship in which those do not overlap with each other, the spare tire housing portion can be situated in a rear portion in the trunk by the amount of the extension plate portion which is situated above the spare tire. Thus, in the trunk structure for a vehicle according to the above aspect, it is easy to put in and out, through a rear area of the trunk, the spare tire and the tonneau cover which are housed in the trunk.

Further, in the trunk structure for a vehicle according to the above aspect, the extension plate portion of the tonneau cover is generally horizontally (a direction intersecting with the up-down direction of the vehicle) situated to cover the upper area of the spare tire. Thus, compared to a structure disclosed in above-discussed International Publication No. WO 2010/079576, the problem of increased height from the ground to the floor board does not occur, and a decrease in loading capacity for goods and degraded usability are avoided.

Consequently, the trunk structure for a vehicle according to the above aspect can house both of the spare tire and the tonneau cover below the floor board in the trunk and has high operability in housing and taking out the spare tire and the tonneau cover.

In the trunk structure for a vehicle according to the above aspect, in a plan view of the trunk from above, the tonneau cover housing portion may have a tonneau cover retainment member which is adjacently arranged in two side areas and in a rear area of the spare tire and retains the tonneau cover, and the tonneau cover retainment member may have front support portions which are provided in both side areas of the spare tire and support a part of the extension plate portion in a state where the part of the extension plate portion is spaced apart from the spare tire and rear support portions which are provided on a rear side of the front support portions and support both ends of the tube portion.

Because the trunk structure for a vehicle according to the above aspect includes the tonneau cover retainment member which has front support portions and the rear support portions, in a case where the spare tire and the tonneau cover are housed below the floor board of the trunk, contact between the extension plate portion of the tonneau cover and the spare tire and movement of the tonneau cover in the front-rear direction in acceleration, deceleration, and so forth of the vehicle can be avoided.

In the trunk structure for a vehicle according to the above aspect, the front support portion may be formed to be positioned higher than the rear support portion, and a stepwise step portion may further be provided which connects the front support portion and the rear support portion together in the front-rear direction of the vehicle.

In the trunk structure for a vehicle according to the above aspect, in the tonneau cover retainment member, the step portion is formed between the front support portion and the rear support portion in the front-rear direction of the vehicle. Thus, in the trunk structure for a vehicle according to the above aspect, compared to a case where the front support portion and the rear support portion are connected together by a flat surface or the like, it becomes possible to improve the rigidity of the tonneau cover retainment member by securing the moment of inertia of area.

In the trunk structure for a vehicle according to the above aspect, the tonneau cover retainment member may further have a recess, which is provided to be recessed toward a front face side, on a back face side of the step portion in a thickness direction of the tonneau cover retainment member.

In the trunk structure for a vehicle according to the above aspect, because the recess is formed in the back face side of the step portion in the tonneau cover retainment member, the volume of the tonneau cover retainment member can be decreased by the amount of thinning by formation of the recess, and reduction in manufacturing cost can be attained.

In the trunk structure for a vehicle according to the above aspect, the tonneau cover retainment member may further have a positioning protruding portion which is provided on the back face side to protrude toward a vehicle body floor side of the trunk compared to other portions and is for positioning in the front-rear direction of the vehicle and in a vehicle width direction.

In the trunk structure for a vehicle according to the above aspect, because the positioning protruding portion is provided to the back face side of the tonneau cover retainment member, the tonneau cover retainment member can be restrained from moving with respect to the vehicle body floor when the vehicle accelerates or decelerates, when the vehicle changes directions, and so forth.

In the trunk structure for a vehicle according to the above aspect, the tonneau cover retainment member may further have a front protruding portion which is situated on a front side of the front support portion and is formed upward higher than the front support portion, and the front protruding portion may be provided such that a gap is formed between the front protruding portion and an end edge portion in the extension plate portion on a side where the front protruding portion is provided in a state where the extension plate portion is placed on the front support portions.

In the trunk structure for a vehicle according to the above aspect, the tonneau cover retainment member is disposed such that a gap is formed between the front protruding portion and the extension plate portion in a state where the tonneau cover is housed. Thus, the trunk structure for a vehicle according to the above aspect has high operability in a case where a user places the extension plate portion of the tonneau cover on the front support portions of the tonneau cover retainment member and takes out the placed extension plate portion.

In the trunk structure for a vehicle according to the above aspect, the tonneau cover retainment member may further have a connection surface portion which connects together the rear support portions provided in both side areas in a vehicle width direction, the rear support portion may be disposed such that a gap is formed between a rear end portion of the tube portion and the rear end of the trunk, and the connection surface portion may be formed such that a gap is formed between an upper surface of the connection surface portion and the tube portion.

In the trunk structure for a vehicle according to the above aspect, the tonneau cover retainment member is disposed such that respective gaps are formed between the rear end portion of the tube portion and the rear end of the trunk and between the tube portion and the connection surface portion. Thus, in the trunk structure for a vehicle according to the above aspect, the user can house or take out the tonneau cover with respect to the tonneau cover housing portion by inserting a finger or a hand through the above gaps. Thus, the trunk structure for a vehicle according to the above aspect has high operability in housing and taking out the tonneau cover with respect to the tonneau cover housing portion in the trunk.

In the trunk structure for a vehicle according to the above aspect, the tonneau cover retainment member may be formed containing a foamed resin material.

In the trunk structure for a vehicle according to the above aspect, because the tonneau cover retainment member is formed containing a foamed resin material (for example, foamed styrol), weight reduction can be attained, and molding into various shapes which conform with the trunk of the vehicle can easily be carried out.

A trunk structure for a vehicle according to each of the above aspects can house both of a spare tire and a tonneau cover below a floor board in a trunk and has high operability in housing and taking out the spare tire and the tonneau cover.

DETAILED DESCRIPTION

An embodiment of the present disclosure will hereinafter be described with reference to drawings. Note that the embodiment described in the following is one example of the present disclosure, and the present disclosure is not limited by the following embodiment at all except inherent configurations of the present disclosure.

In the drawings used in the following description, "Fr" denotes the vehicle front side, "Re" denotes the vehicle rear side, "Ri" denotes the vehicle right side, "Le" denotes the vehicle left side, "Up" denotes the vehicle upper side, and "Lo" denotes the vehicle lower side.

1. Structure of Trunk 1a in Vehicle 1

A description will be made, by using FIG. 1, of a structure of a trunk 1a in a vehicle 1 according to this embodiment of the present disclosure. Note that FIG. 1 does not illustrate a floor board attached to a lower portion of the trunk 1a.

Figure 1:
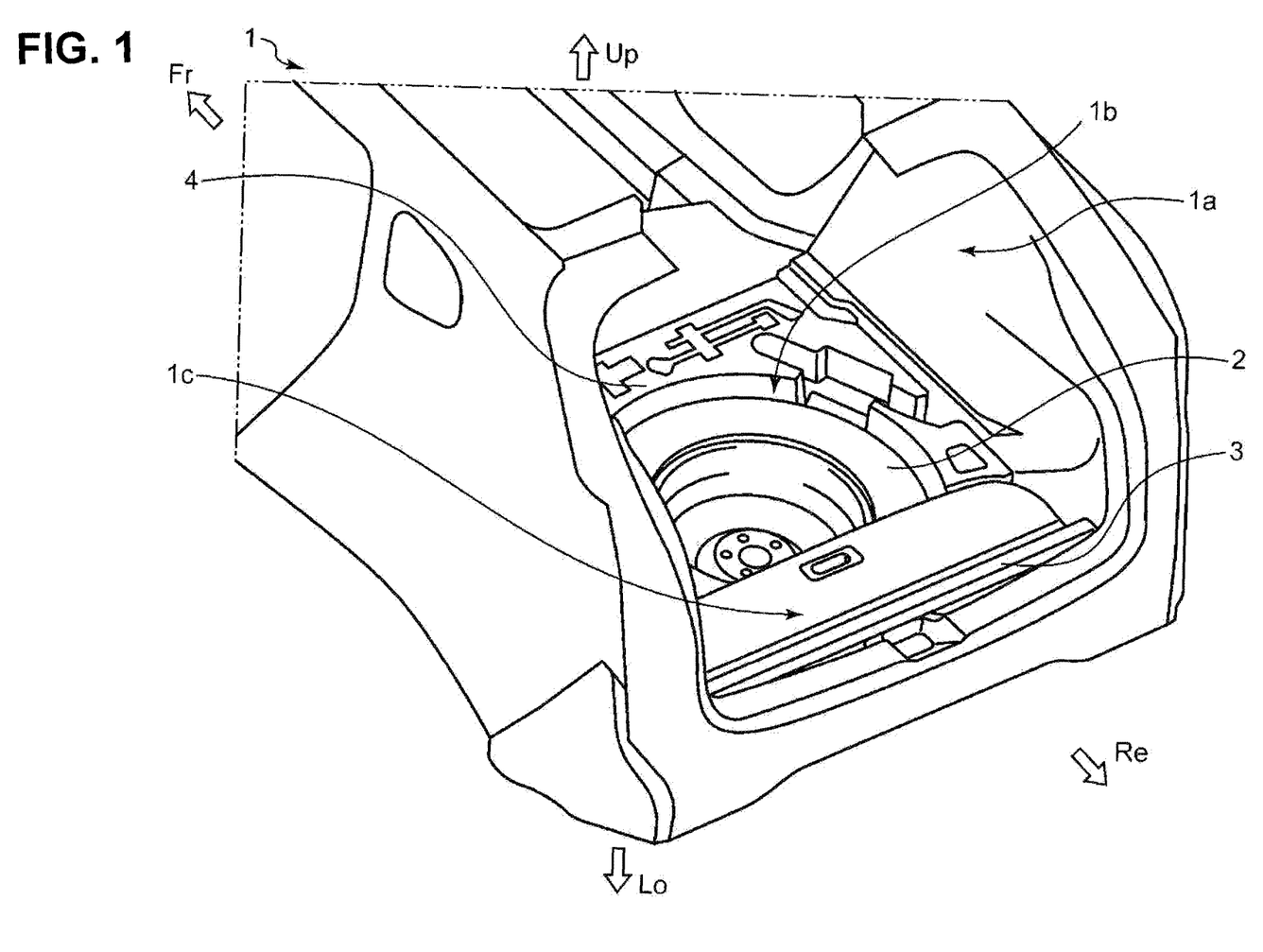
FIG. 1 is a perspective view illustrating a trunk structure for a vehicle according to an embodiment of the present disclosure.

As illustrated in FIG. 1, in the trunk 1a of the vehicle 1, a spare tire housing portion 1b and a tonneau cover housing portion 1c are provided to a region below the floor board which is not illustrated.

The spare tire housing portion 1b is capable of housing a spare tire 2. The tonneau cover housing portion 1c is capable of housing a tonneau cover 3 in a rolled state.

Furthermore, in the trunk 1a, a frame-shaped member 4 is disposed so as to surround a periphery of the spare tire 2 housed in the spare tire housing portion 1b. Although a role of the frame-shaped member 4 will be described later, the frame-shaped member 4 is formed containing a foamed resin material such as foamed styrol.

2. Structure of Tonneau Cover 3

A structure of the tonneau cover 3 will be described by using FIG. 2.

Figure 2:
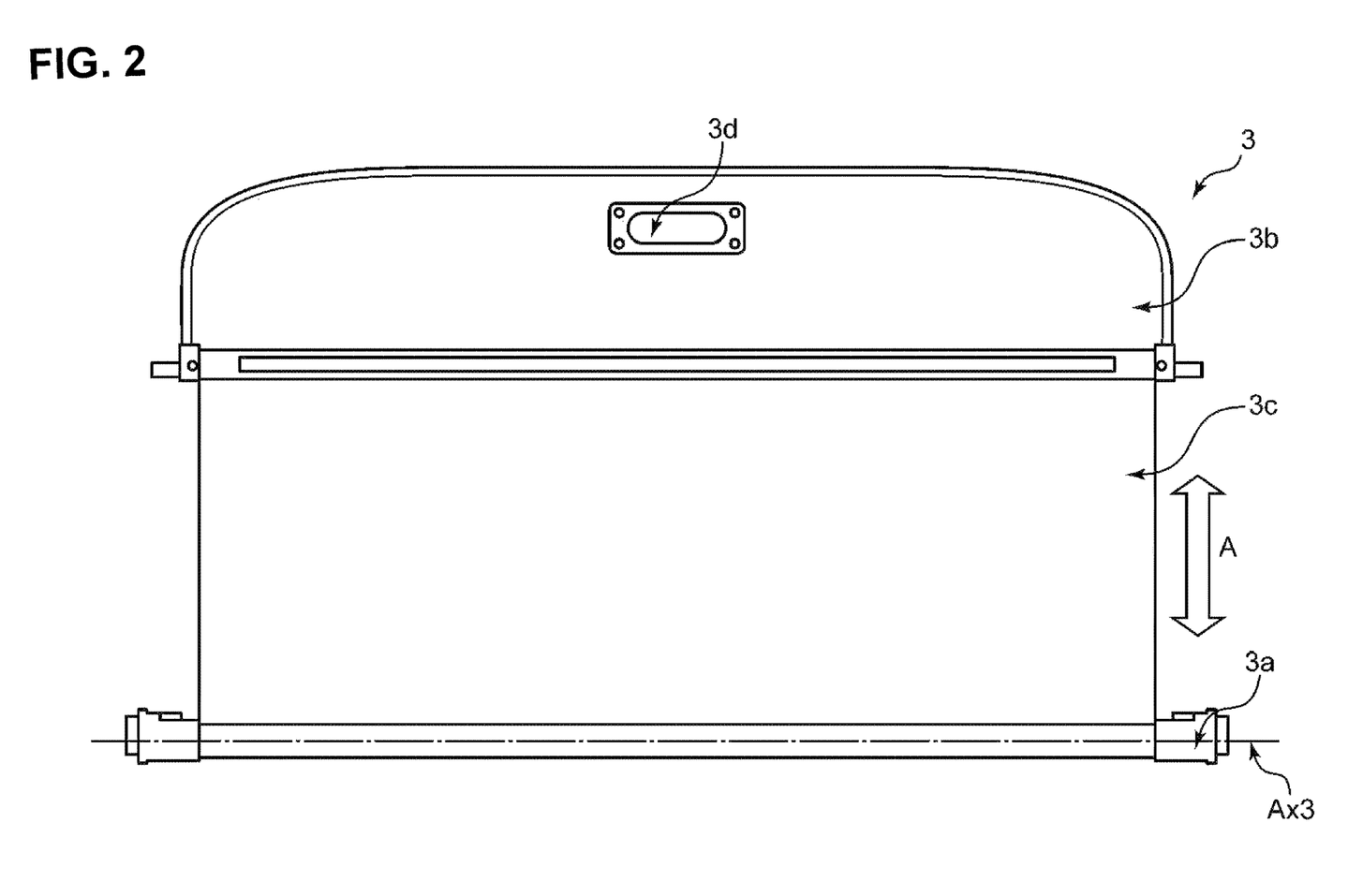
FIG. 2 is a plan view illustrating a structure of a tonneau cover.

As illustrated in FIG. 2, the tonneau cover 3 is a roll-up type tonneau cover and has a tube portion 3a, a sheet portion 3c, and an extension plate portion 3b. The tube portion 3a has a tubular shape. The sheet portion 3c is capable of being rolled in and drawn out from an inside of the tube portion 3a (tube inner space) as indicated by arrow A. Note that a spring not illustrated is mounted on the tube portion 3a, and an urging force to roll the sheet portion 3c around a rolling core Ax3 is exerted on the tube portion 3a.

The extension plate portion 3b is connected with an end edge of the sheet portion 3c and maintains a state where the extension plate portion 3b is extended toward the outside of the tube portion 3a even in a state where the sheet portion 3c is rolled up in the tube portion 3a. The extension plate portion 3b is formed including a plate-shaped member and has a grip hole portion 3d to be gripped by a user. The user can draw out the sheet portion 3c from the tube portion 3a by gripping the grip hole portion 3d.

3. Housing of Spare Tire 2 and Tonneau Cover 3 in Trunk 1a

Housing of the spare tire 2 and the tonneau cover 3 in the trunk 1a will be described by using FIG. 3 and FIG. 4. Note that illustration is made in both of FIG. 3 and FIG. 4 while the floor board is omitted.

Figure 3:
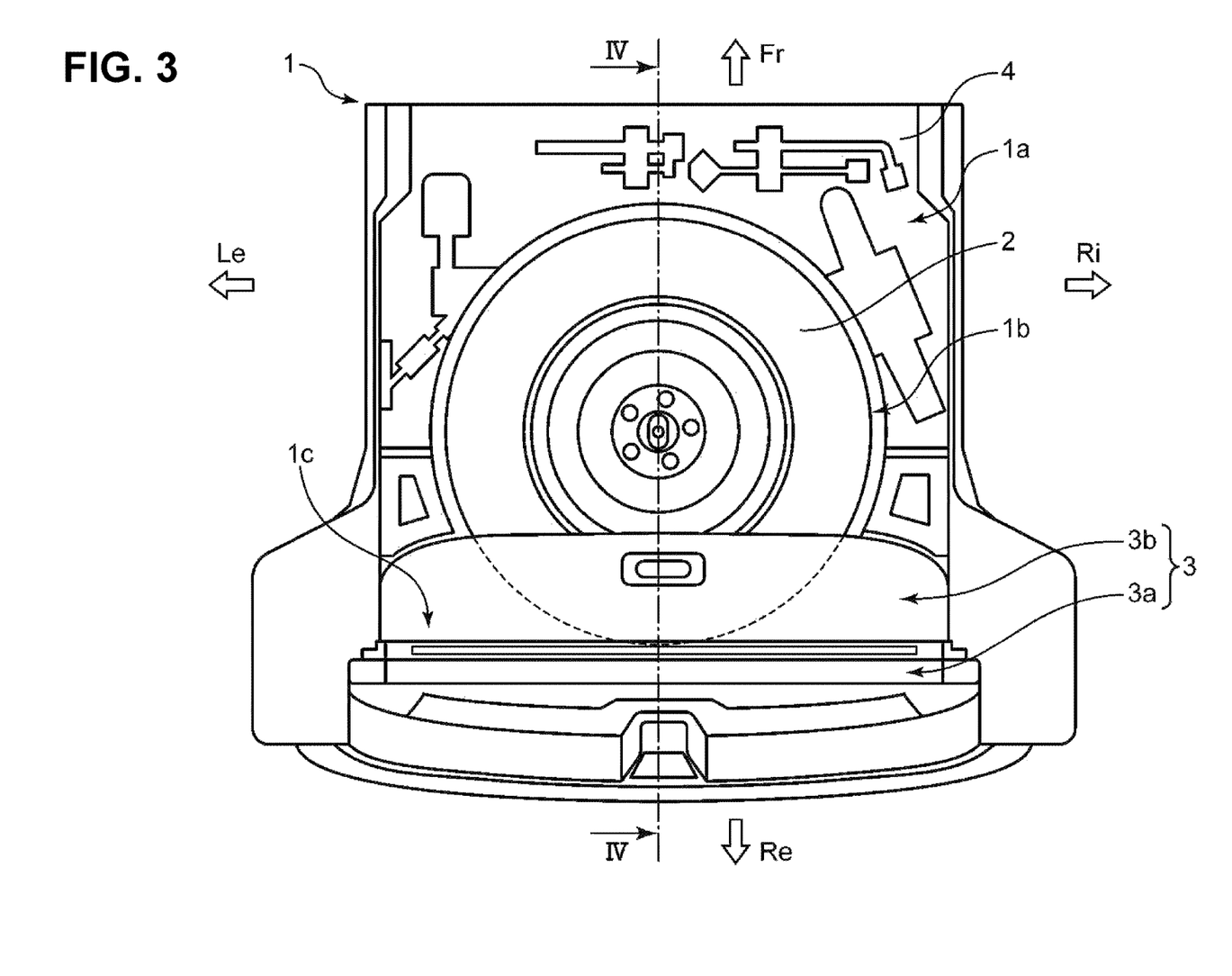
FIG. 3 is a plan view illustrating the trunk structure for a vehicle.
Figure 4:
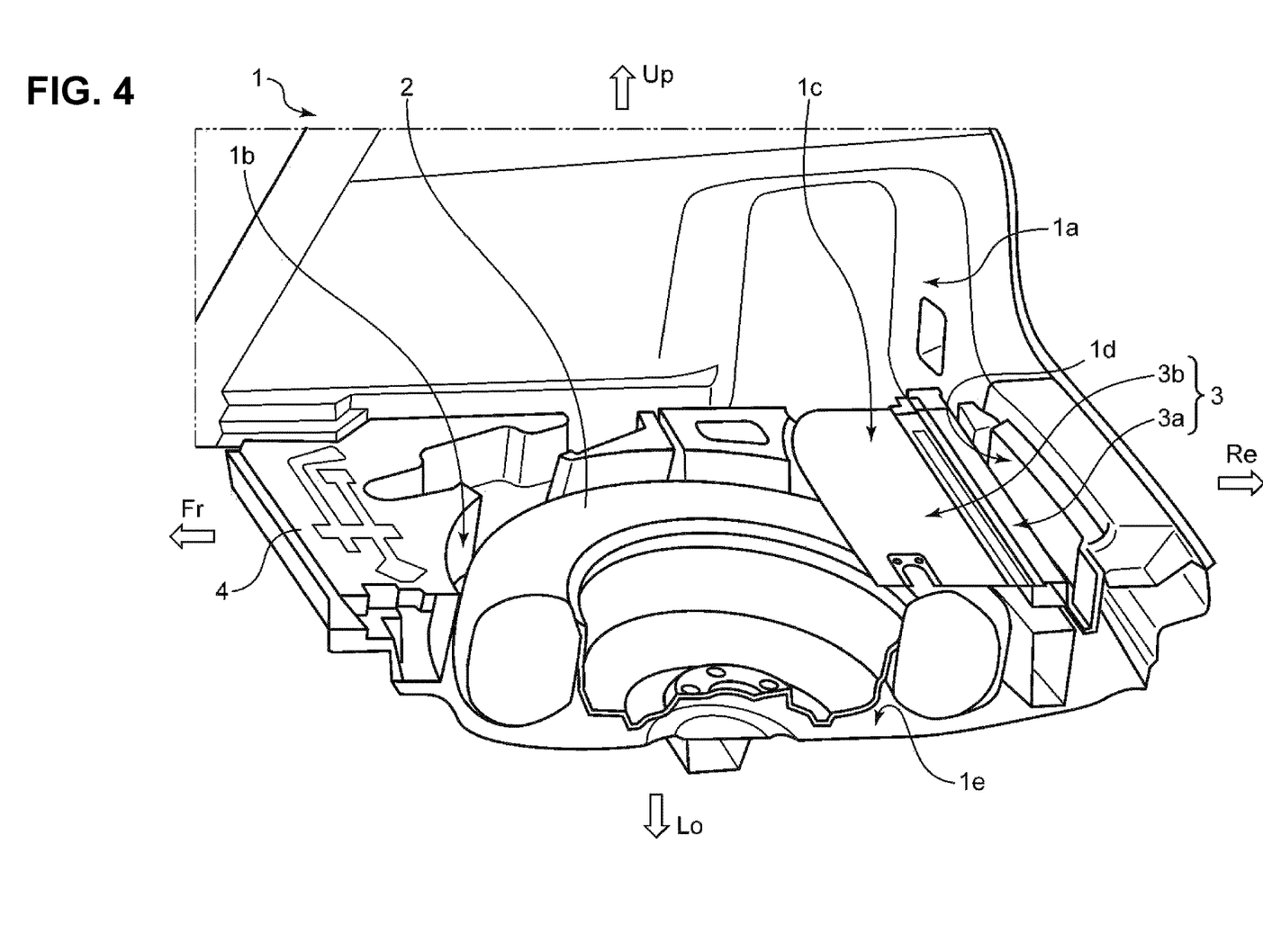
FIG. 4 is a partial cross-sectional view illustrating the trunk structure for a vehicle.

As illustrated in FIG. 3 and FIG. 4, the spare tire housing portion 1b of the trunk 1a has a spare tire pan 1e which is formed to be concaved downward. The spare tire 2 is placed on the spare tire pan 1e in a posture in which a radial direction is generally horizontal.

The frame-shaped member 4 is situated so as to surround the periphery of the spare tire 2 housed in the spare tire housing portion 1b. Although a detailed description will not be made, the frame-shaped member 4 is provided with a concaved portion which retains on-vehicle tools or a jack.

As illustrated in FIG. 4, in a state where the tonneau cover 3 in the rolled state is housed in the tonneau cover housing portion 1c, the tube portion 3a is arranged in a region between the spare tire housing portion 1b and a rear end 1d of the trunk 1a. Furthermore, as illustrated in FIG. 3 and FIG. 4, the extension plate portion 3b of the tonneau cover 3 is arranged in a generally horizontal direction (a direction generally orthogonal to the up-down direction of the vehicle 1) to cover an upper area of a part (a portion on a rear side) of the spare tire 2 housed in the spare tire housing portion 1b.

4. Structure of Frame-Shaped Member 4

A structure of the frame-shaped member 4 will be described by using FIG. 5 and FIG. 6. Note that FIG. 5 is a perspective view of a front face side of the frame-shaped member 4 as seen from obliquely above, and FIG. 6 is a perspective view of a back face side of the frame-shaped member 4 as seen from obliquely below.

Figure 5:
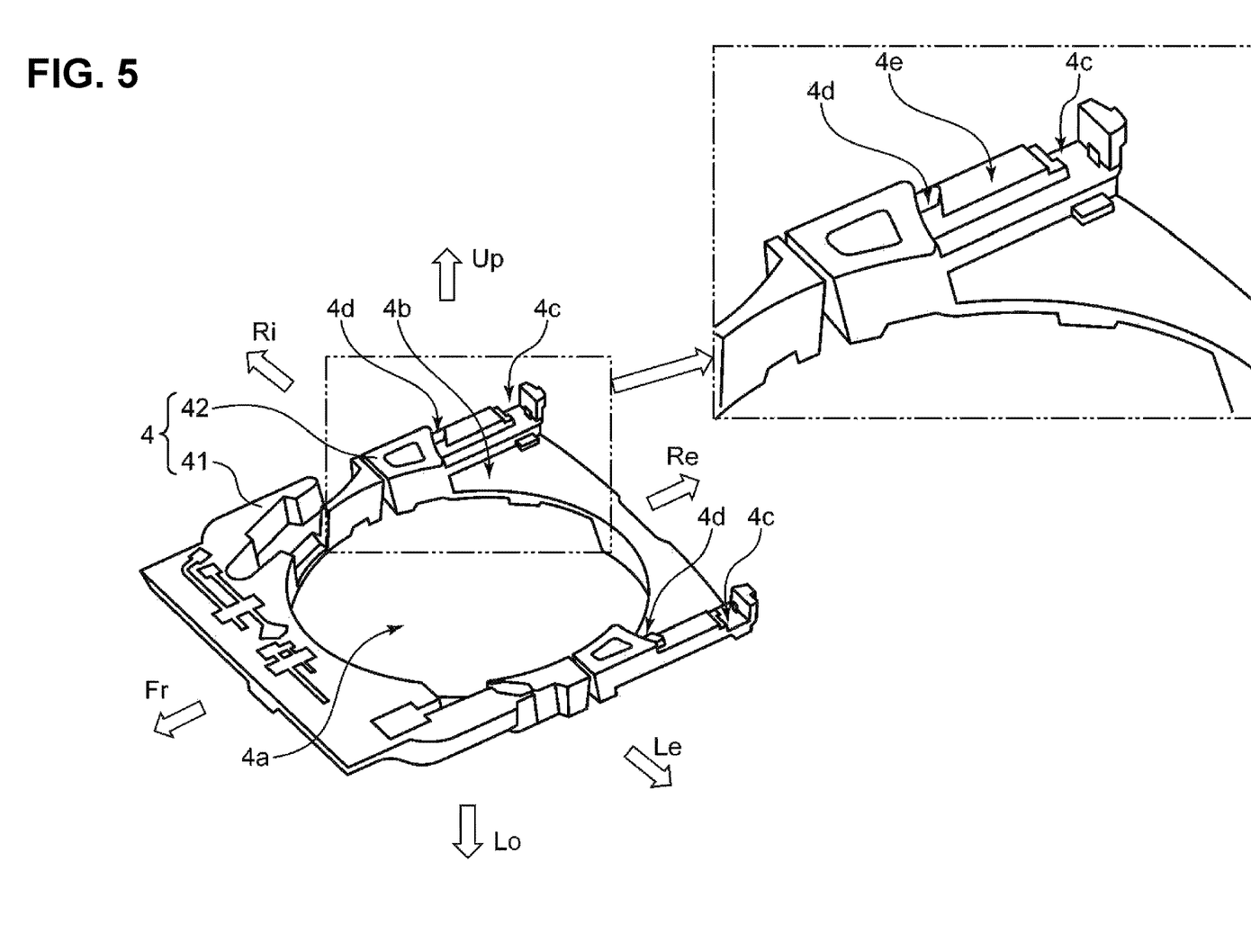
FIG. 5 is a perspective view illustrating a hosing retainment member.
Figure 6:
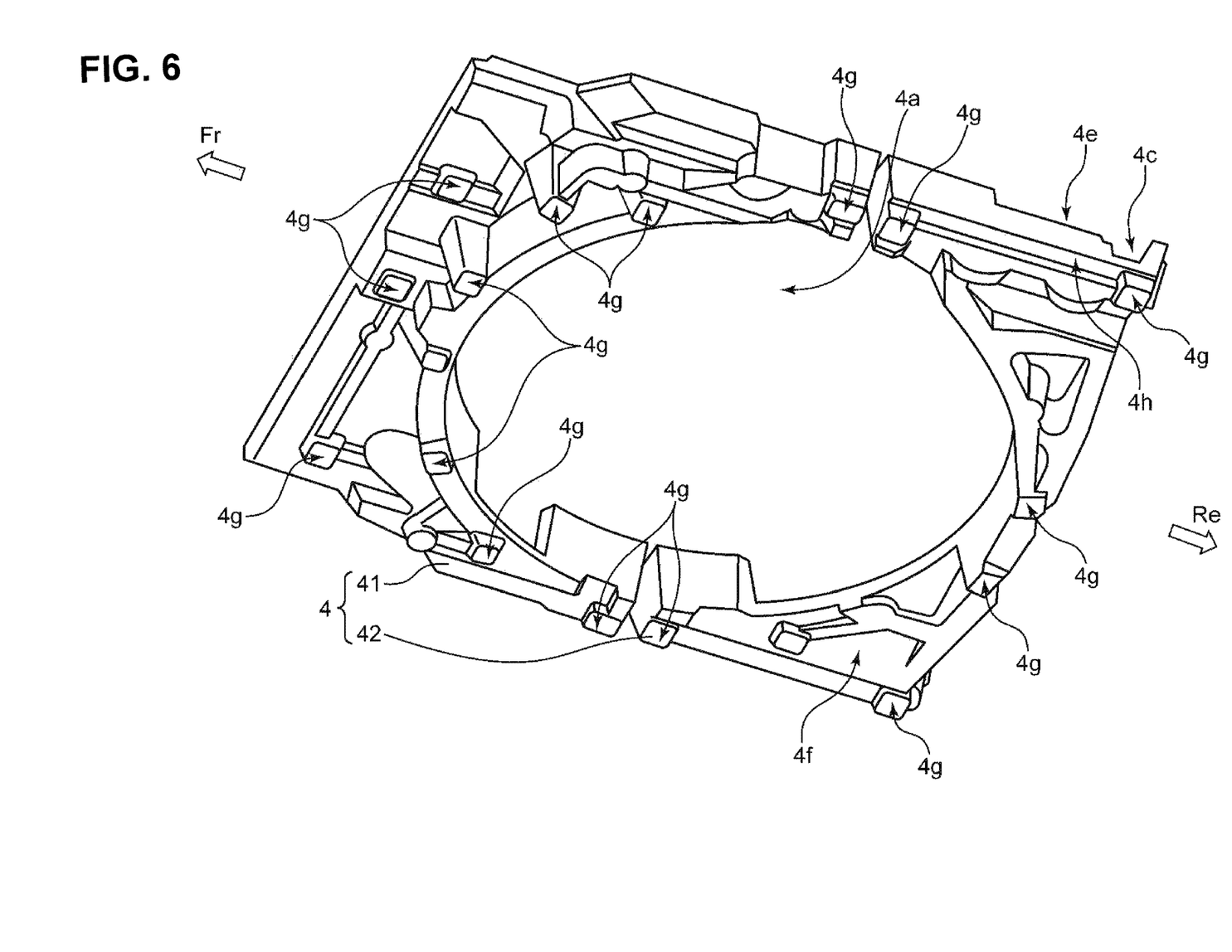
FIG. 6 is a perspective view illustrating a back face of the hosing retainment member.

As illustrated in FIG. 5, the frame-shaped member 4 is configured with a combination of a front member 41 and a rear member 42. The front member 41 and the rear member 42 are arranged to abut each other or to be adjacent to each other in a front-rear direction. In a plan view from above, the frame-shaped member 4 configured with the combination of the front member 41 and the rear member 42 has a generally rectangular outer peripheral shape and has an opening 4a with a diameter slightly larger than an assumed outer diameter of the spare tire 2.

In the trunk 1a, an upper area of the rear member 42 corresponds to the tonneau cover housing portion 1c. In other words, the tonneau cover housing portion 1c has the rear member 42 as a tonneau cover retainment member. In both of left and right side portions in the rear member 42, front support portions 4d and rear support portions 4c are formed. The front support portions 4d are sections which support both side end portions of the extension plate portion 3b in the tonneau cover 3 in the rolled state. The rear support portions 4d are sections which support both side end portions of the tube portion 3a in the tonneau cover 3 in the rolled state.

As illustrated in the enlarged part in FIG. 5, in the rear member 42, the front support portion 4d is positioned higher than the rear support portion 4c. Further, in a region between the front support portion 4d and the rear support portion 4c in the rear member 42, a step portion 4e is provided which is stepwise formed.

As illustrated in FIG. 6, a back face 4f of the frame-shaped member 4 is provided with plural positioning protruding portions 4g, throughout both members of the front member 41 and the rear member 42. The positioning protruding portion 4g is a section which protrudes downward compared to the other portions in the back face 4f and is for positioning the frame-shaped member 4 when the frame-shaped member 4 is placed on a vehicle body floor.

Further, in the back face 4f of the frame-shaped member 4, recesses 4h which are recessed toward the front face side are formed in both of left and right side portions of the rear member 42.

5. Specific Structures of Both of Left and Right Side Portions in Rear Member 42

A description will be made, by using FIG. 7 to FIG. 9, about specific structures of both of left and right side portions of the rear member 42 as a member for retaining the tonneau cover 3.

Figure 7:
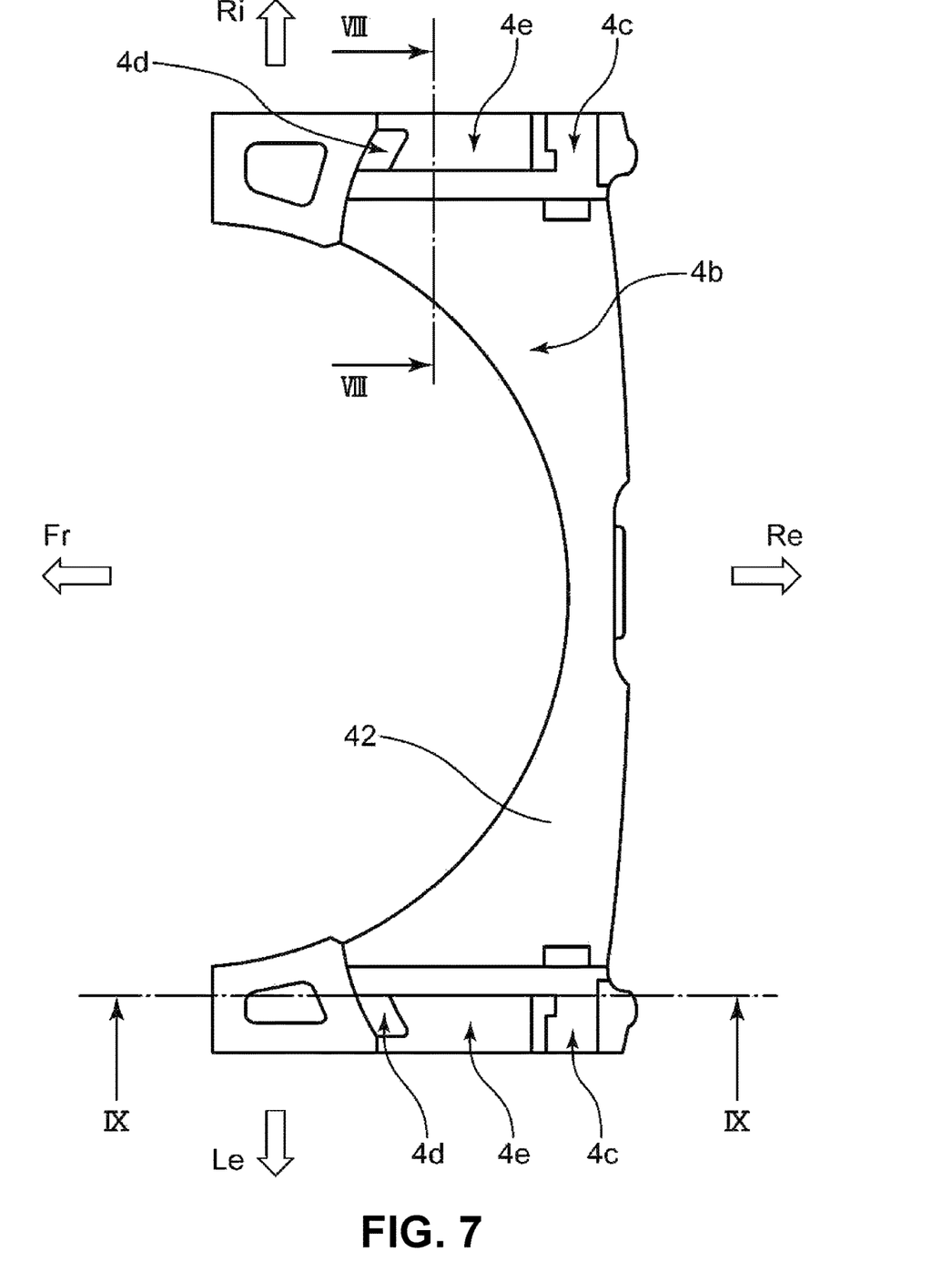
FIG. 7 is a plan view illustrating a rear member in the hosing retainment member.

As illustrated in FIG. 7, the rear member 42 has a tonneau cover arrangement portion 4b above which the tonneau cover 3 in the rolled state is disposed. In both of left and right side portions in the tonneau cover arrangement portion 4b, as described above, the front support portions 4d, the step portions 4e, and the rear support portions 4c are formed.

Figure 8:
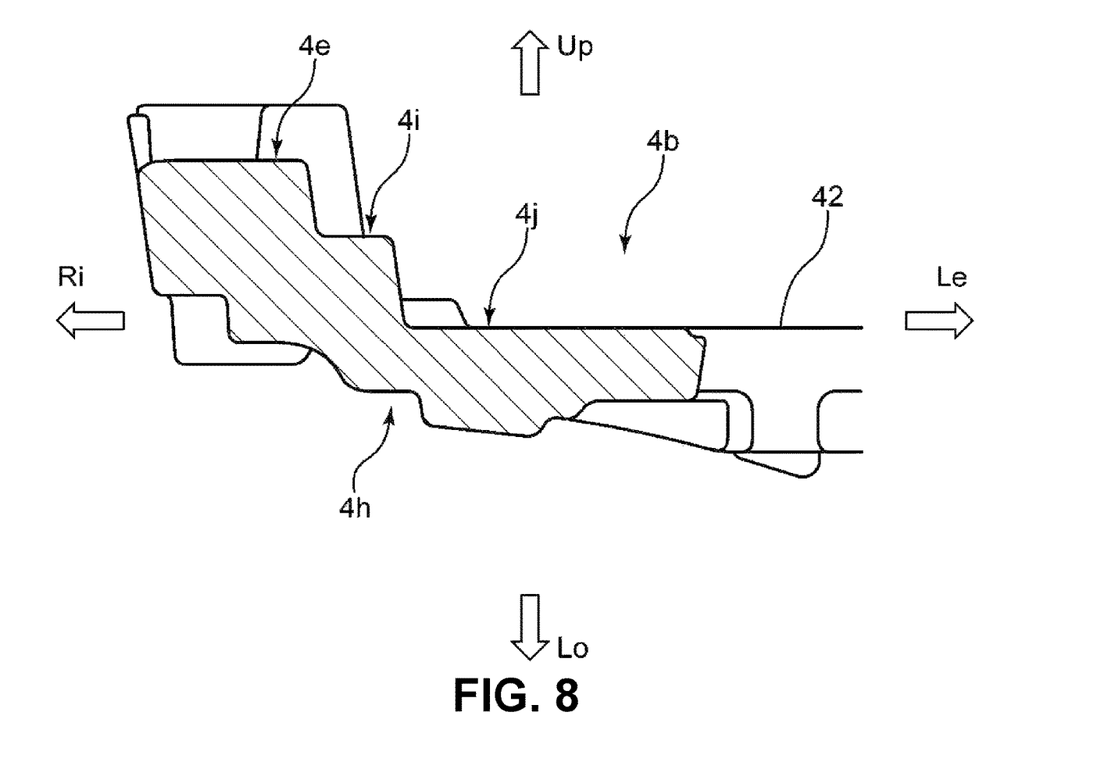
FIG. 8 is a cross-sectional view illustrating a cross section taken along line VIII-VIII in FIG. 7.

As illustrated in FIG. 8, in a case of viewing the cross section taken along line VIII-VIII in FIG. 7, each of both of the left and right side portions in the tonneau cover arrangement portion 4b is stepwise formed such that the heights become lower in order of the step portion 4e, an intermediate layer portion 4i, and a lower layer portion 4j. Furthermore, the recess 4h is provided to the back face 4f side of a region including a boundary portion between the intermediate layer portion 4i and the lower layer portion 4j.

Figure 9:
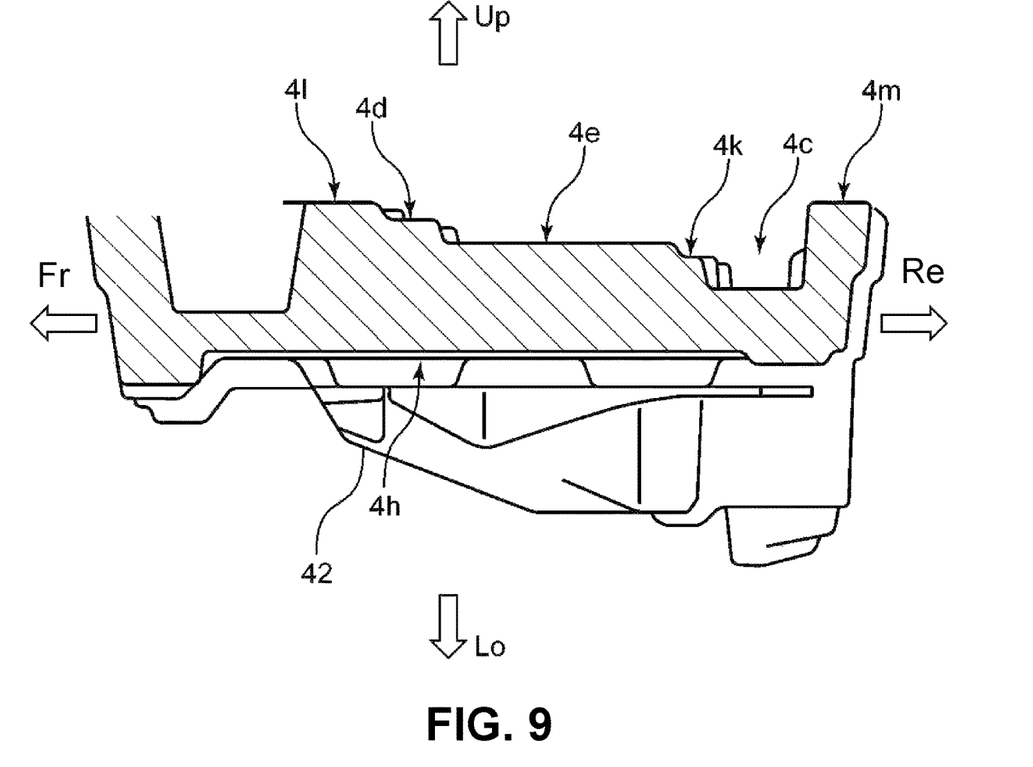
FIG. 9 is a cross-sectional view illustrating a cross section taken along line IX-IX in FIG. 7.

As illustrated in FIG. 9, in a case of viewing the cross section taken along line IX-IX, each of both of the left and right side portions in the tonneau cover arrangement portion 4b is stepwise formed such that the heights become lower in order of the front support portion 4d, the step portion 4e, an intermediate layer portion 4k, and the rear support portion 4c. Furthermore, a front protruding portion 4l with a higher height than the front support portion 4d is provided in further front of the front support portion 4d, and a rear protruding portion 4m with generally the same height as the front protruding portion 4l is formed in further rear of the rear support portion 4c. The front protruding portion 4l is a stopper portion for inhibiting the extension plate portion 3b of the tonneau cover 3, which is supported by the front support portions 4d, from moving forward. The rear protruding portion 4m is a stopper portion for inhibiting the tube portion 3a of the tonneau cover 3, which is supported by the rear support portions 4c, from moving rearward.

The recess 4h is provided to the back face 4f side of a region from the front protruding portion 4l to the rear support portion 4c in the front-rear direction.

6. Arrangement of Tonneau Cover 3 to Rear Member 42

An arrangement manner of the tonneau cover 3 to the rear member 42 will be described by using FIG. 10. Note that although illustration is made in FIG. 10 in which only right side portions in the rear member 42 and the tonneau cover 3 are shown, left side portions which are not illustrated have a similar arrangement relationship.

Figure 10:
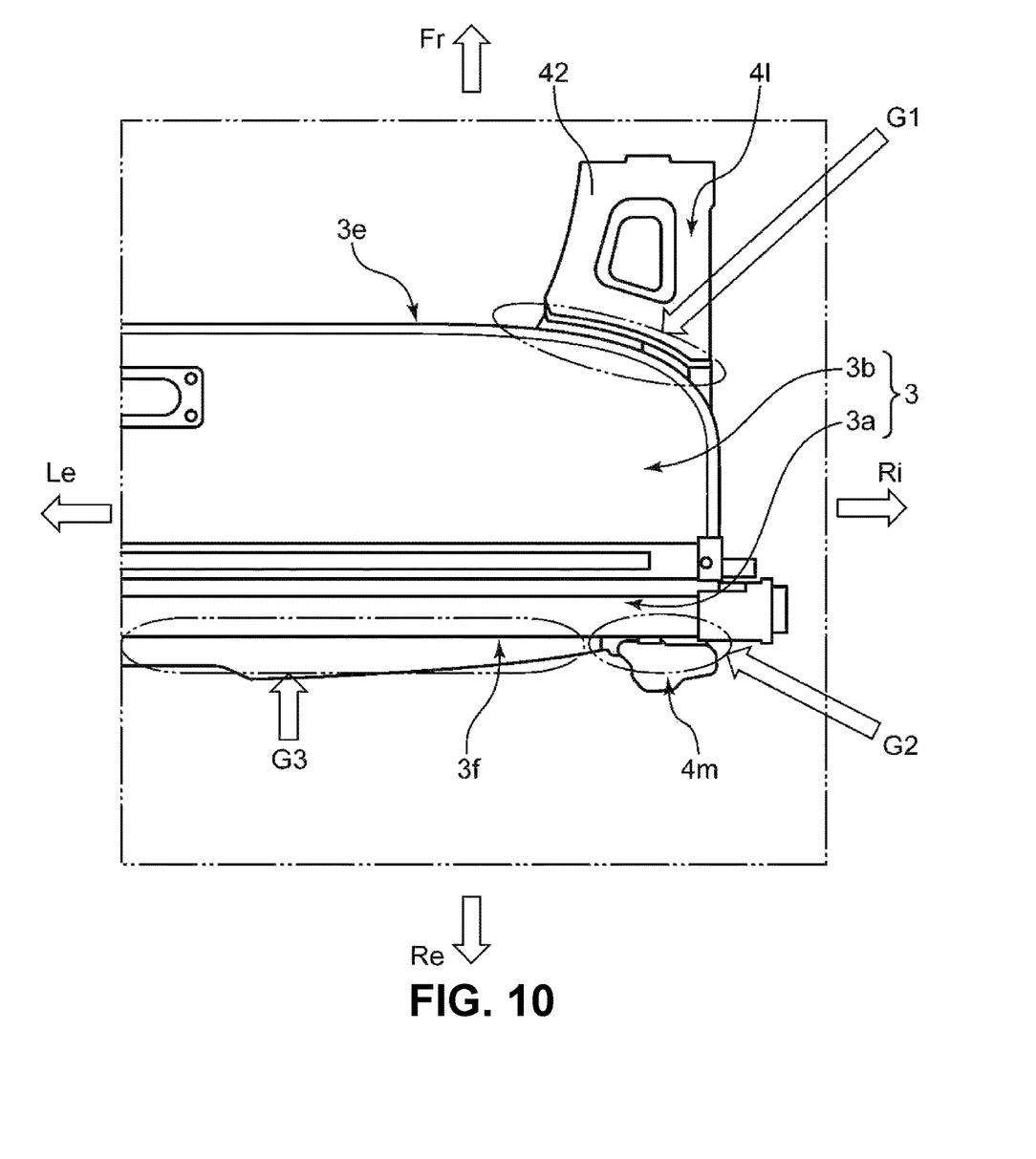
FIG. 10 is a plan view illustrating an arrangement relationship between the housing retainment member and the tonneau cover.

As illustrated in FIG. 10, the rear member 42 is provided such that a gap is formed between a front end edge portion 3e of the extension plate portion 3b in the tonneau cover 3 and the front protruding portion 4l of the rear member 42 (the portion indicated by an arrow G1) in a state where the tonneau cover 3 is placed on the rear member 42 in a frame-shaped member 4.

Further, the rear member 42 is provided such that a gap is also formed between a rear end portion 3f of the tube portion 3a of the tonneau cover 3 and the rear protruding portion 4m of the rear member 42 (the portion indicated by an arrow G2) in a state where the tonneau cover 3 is retained by the rear member 42.

In addition, the rear member 42 is disposed such that gaps are formed between the rear end portion 3f of the tube portion 3a of the tonneau cover 3 and the rear end 1d of the trunk 1a (see FIG. 4) (the portion indicated by an arrow G3) and between the tube portion 3a of the tonneau cover 3 and the lower layer portion (connection surface portion) 4j of the rear member 42 in a state where the tonneau cover 3 is retained by the rear member 42.

7. Effects

In the structure of the trunk 1a for the vehicle 1 according to the present embodiment, in a state where the spare tire 2 and the tonneau cover 3 are housed below the floor board, the extension plate portion 3b of the tonneau cover 3 is situated to cover the upper area of a part of the spare tire 2. Thus, in the structure of the trunk 1a for the vehicle 1 according to the present embodiment, while both of the spare tire 2 and the tonneau cover 3 are housed in the trunk 1a, the size of a housing portion in the front-rear direction (the total size of the spare tire housing portion 1b and the tonneau cover housing portion 1c) can be reduced to a small size. That is, in the structure of the trunk 1a for the vehicle 1 according to the present embodiment, compared to a case where the spare tire housing portion and the tonneau cover housing portion are aligned in the front-rear direction in a positional relationship in which those do not overlap with each other, the spare tire housing portion 1b can be situated in a rear portion of the trunk 1a by the amount of the extension plate portion 3b which is situated above the spare tire 2. Thus, in the structure of the trunk 1a for the vehicle 1, it is easy to put in and out, through a rear area (rear hatch) of the trunk 1a, the spare tire 2 and the tonneau cover 3 which are housed in the trunk 1a.

Further, in the structure of the trunk 1a for the vehicle 1 according to the present embodiment, the extension plate portion 3b of the tonneau cover 3 is generally horizontally (a direction intersecting with the up-down direction of the vehicle 1) situated to cover the upper area of the spare tire 2. Thus, compared to a structure disclosed in above-discussed International Publication No. WO 2010/079576, the height from the ground to the floor board is reduced, and a decrease in loading capacity for the trunk 1a and degraded usability are avoided.

Consequently, the structure of the trunk 1a for the vehicle 1 according to the present embodiment can house both of the spare tire 2 and the tonneau cover 3 below the floor board in the trunk 1a, can reduce the front-rear length of the trunk 1a to a short length, and has high operability in housing and taking out the spare tire 2 and the tonneau cover 3.

Because the structure of the trunk 1a for the vehicle 1 according to the present embodiment includes the rear member 42 which has the front support portions 4d and the rear support portions 4c, in a case where the spare tire 2 and the tonneau cover 3 are housed below the floor board of the trunk 1a, contact between the extension plate portion 3b of the tonneau cover 3 and the spare tire 2 and movement of the tonneau cover 3 in the front-rear direction in acceleration, deceleration, and so forth of the vehicle 1 can be reduced.

In the structure of the trunk 1a for the vehicle 1 according to the present embodiment, in the rear member 42, the step portions 4e are formed between the front support portions 4d and the rear support portions 4c in the front-rear direction of the vehicle 1. Thus, in the structure of the trunk 1a for the vehicle 1 according to the present embodiment, compared to a case where the front support portions 4d and the rear support portions 4c are connected together by flat surfaces or the like, it becomes possible to attain an improvement in rigidity of the rear member 42 by securing the moment of inertia of area.

In the structure of the trunk 1a for the vehicle 1 according to the present embodiment, because the recesses 4h are formed on the back face 4f side of the step portions 4e in the rear member 42, the volume of the rear member 42 can be decreased by the amount of thinning by formation of the recesses 4h, and reduction in manufacturing cost can be attained.

In the structure of the trunk 1a for the vehicle 1 according to the present embodiment, because the positioning protruding portions 4g are provided to the back face 4f side of the rear member 42, the rear member 42 can be restrained from moving with respect to the vehicle body floor when the vehicle 1 accelerates or decelerates, and when the vehicle 1 changes directions, and so forth.

In the structure of the trunk 1a for the vehicle 1 according to the present embodiment, the rear member 42 is disposed such that gaps are formed between the front protruding portions 41 and a front end edge portion 3e of the extension plate portion 3b in a state where the tonneau cover 3 is housed. Thus, the structure of the trunk 1a for the vehicle 1 has high operability in a case where the user places the extension plate portion 3b of the tonneau cover 3 on the front support portions 4d of the rear member 42 and takes out the placed extension plate portion 3b.

In the structure of the trunk 1a for the vehicle 1 according to the present embodiment, the rear member 42 is disposed such that respective gaps are formed between the rear end portion 3f of the tube portion 3a of the tonneau cover 3 and the rear end 1d of the trunk 1a and between the tube portion 3a of the tonneau cover 3 and the lower layer portion 4j. Thus, in the structure of the trunk 1a for the vehicle 1, the user can house or take out the tonneau cover 3 with respect to the tonneau cover housing portion 1c by inserting a finger or a hand in the gaps among the tube portion 3a, the rear end 1d, and the lower layer portion 4j. Thus, the structure of the trunk 1a for the vehicle 1 according to the present embodiment has high operability in housing and taking out the tonneau cover 3 with respect to the tonneau cover housing portion 1c in the trunk 1a.

In the structure of the trunk 1a for the vehicle 1 according to the present embodiment, because the frame-shaped member 4 including the rear member 42 is formed containing a foamed resin material (for example, foamed styrol), weight reduction can be attained, and molding into various shapes which conform with the trunk 1a of the vehicle 1 can easily be carried out.

As described above, the structure of the trunk 1a for the vehicle 1 according to the present embodiment can house both of the spare tire 2 and the tonneau cover 3 below the floor board in the trunk 1a and has high operability in housing and taking out the spare tire 2 and the tonneau cover 3.

In the above embodiment, the rear member 42 is provided which has the support portions 4c and 4d supporting the tube portion 3a and the extension plate portion 3b of the tonneau cover 3; however, the present disclosure is not limited to this. For example, it is possible to provide a section which supports a tube portion and an extension plate portion of a tonneau cover to trim in a side area of a trunk.

In the above embodiment, in the rear member 42 of the frame-shaped member 4, an improvement in rigidity is attained by providing the step portion 4e between the front support portion 4d and the rear support portion 4c; however, in the present disclosure, providing a step portion in a rear member is not an essential requirement. In this case, it is also possible to attain an improvement in rigidity by providing one or plural ribs in a surface portion which connects the front support portion and the rear support portion together.

In the above embodiment, the plural positioning protruding portions 4g are provided to the back face 4f of the rear member 42; however, providing a positioning protruding portion in a back face of a rear member is not an essential requirement.

In the above embodiment, in the rear member 42, the rear support portion 4c is provided to each of the left and right sides; however, one support portion may be provided to a central portion in a vehicle width direction.

In the above embodiment, the front member 41 and the rear member 42 in the frame-shaped member 4 are formed by using a foamed resin material (specifically, foamed styrol); however, forming materials of the front member and the rear member are not limited to this. For example, a hollow frame can also be employed which is formed by blow molding or the like of a resin material.

What is claimed is:

1. A trunk structure for a vehicle, the trunk structure being capable of housing a spare tire and a roll-up type tonneau cover below a floor board of a trunk, the trunk structure comprising:
    a spare tire housing portion below the floor board for housing the spare tire; and
    a tonneau cover housing portion below the floor board for housing the tonneau cover in a rolled state, wherein
    the tonneau cover has
    a tube portion which has a tubular shape,
    a sheet portion which is capable of being rolled in and drawn out from an inside of the tube portion, and
    a plate-shaped extension plate portion which is connected with an end edge of the sheet portion and is situated on an outside of the tube portion in a state where the sheet portion is rolled in the tube portion, and
    the tonneau cover housing portion has
    a portion which is located between the spare tire housing portion and a rear end of the trunk in a front-rear direction of the vehicle and in which the tube portion is arranged, and
    a portion which is located above a part of the spare tire housed in the spare tire housing portion and in which the extension plate portion is arranged in a direction intersecting with an up-down direction of the vehicle so as to cover the part of the spare tire.

2. The trunk structure for a vehicle according to claim 1, wherein
    in a plan view of the trunk from above, the tonneau cover housing portion has a tonneau cover retainment member which is adjacently arranged in two side areas and in a rear area of the spare tire and retains the tonneau cover, and
    the tonneau cover retainment member has
    front support portions in both side areas of the spare tire which support a part of the extension plate portion in a state where the part of the extension plate portion is spaced apart from the spare tire, and
    rear support portions on a rear side of the front support portions which support both ends of the tube portion.

3. The trunk structure for a vehicle according to claim 2, wherein
    the front support portion is positioned higher than the rear support portion, and
    a stepwise step portion is further provided which connects the front support portion and the rear support portion together in the front-rear direction of the vehicle.

4. The trunk structure for a vehicle according to claim 3, wherein
    the tonneau cover retainment member further has a recess, which is recessed toward a front face side, on a back face side of the step portion in a thickness direction of the tonneau cover retainment member.

5. The trunk structure for a vehicle according to claim 4, wherein
the tonneau cover retainment member further has a positioning protruding portion on the back face side protruding toward a vehicle body floor side of the trunk compared to other portions for positioning in the front-rear direction of the vehicle and in a vehicle width direction.

6. The trunk structure for a vehicle according to claim 5, wherein
the tonneau cover retainment member further has a front protruding portion which is situated on a front side of the front support portion and is formed upward higher than the front support portion, and
the front protruding portion is disposed such that a gap is formed between the front protruding portion and an end edge portion in the extension plate portion on a side where the front protruding portion is provided when the extension plate portion is placed on the front support portions.

7. The trunk structure for a vehicle according to claim 6, wherein
the tonneau cover retainment member further has a connection surface portion which connects together the rear support portions provided in both side areas in a vehicle width direction,
the rear support portion is disposed such that a gap is formed between a rear end portion of the tube portion and the rear end of the trunk, and
the connection surface portion forms a gap between an upper surface of the connection surface portion and the tube portion.

8. The trunk structure for a vehicle according claim 7, wherein
the tonneau cover retainment member comprises a foamed resin material.

9. The trunk structure for a vehicle according to claim 2, wherein
the tonneau cover retainment member further has a front protruding portion which is situated on a front side of the front support portion and is formed upward higher than the front support portion, and
the front protruding portion is disposed such that a gap is formed between the front protruding portion and an end edge portion in the extension plate portion on a side where the front protruding portion is provided when the extension plate portion is placed on the front support portions.

10. The trunk structure for a vehicle according to claim 2, wherein
the tonneau cover retainment member further has a connection surface portion which connects together the rear support portions provided in both side areas in a vehicle width direction,
the rear support portion is disposed such that a gap is formed between a rear end portion of the tube portion and the rear end of the trunk, and
the connection surface portion forms a gap between an upper surface of the connection surface portion and the tube portion.

11. The trunk structure for a vehicle according to claim 2, wherein
the tonneau cover retainment member comprises a foamed resin material.

12. The trunk structure for a vehicle according to claim 3, wherein
the tonneau cover retainment member further has a front protruding portion which is situated on a front side of the front support portion and is formed upward higher than the front support portion, and
the front protruding portion is disposed such that a gap is formed between the front protruding portion and an end edge portion in the extension plate portion on a side where the front protruding portion is provided when the extension plate portion is placed on the front support portions.

13. The trunk structure for a vehicle according to claim 3, wherein
the tonneau cover retainment member further has a connection surface portion which connects together the rear support portions provided in both side areas in a vehicle width direction,
the rear support portion is disposed such that a gap is formed between a rear end portion of the tube portion and the rear end of the trunk, and
the connection surface portion forms a gap between an upper surface of the connection surface portion and the tube portion.

14. The trunk structure for a vehicle according claim 3, wherein
the tonneau cover retainment member comprises a foamed resin material.

15. The trunk structure for a vehicle according to claim 4, wherein
the tonneau cover retainment member further has a front protruding portion which is situated on a front side of the front support portion and is formed upward higher than the front support portion, and
the front protruding portion is disposed such that a gap is formed between the front protruding portion and an end edge portion in the extension plate portion on a side where the front protruding portion is provided when the extension plate portion is placed on the front support portions.

16. The trunk structure for a vehicle according to claim 4, wherein
the tonneau cover retainment member further has a connection surface portion which connects together the rear support portions provided in both side areas in a vehicle width direction,
the rear support portion is disposed such that a gap is formed between a rear end portion of the tube portion and the rear end of the trunk, and
the connection surface portion forms a gap between an upper surface of the connection surface portion and the tube portion.

17. The trunk structure for a vehicle according claim 4, wherein
the tonneau cover retainment member comprises a foamed resin material.

18. The trunk structure for a vehicle according to claim 5, wherein
the tonneau cover retainment member further has a connection surface portion which connects together the rear support portions provided in both side areas in a vehicle width direction,
the rear support portion is disposed such that a gap is formed between a rear end portion of the tube portion and the rear end of the trunk, and the connection surface portion forms a gap between an upper surface of the connection surface portion and the tube portion.

19. The trunk structure for a vehicle according claim 5, wherein the tonneau cover retainment member comprises a foamed resin material.

20. The trunk structure for a vehicle according claim 6, wherein the tonneau cover retainment member comprises a foamed resin material.

\* \* \* \* \*